United States Patent [19]

Smith

[11] 4,453,583

[45] Jun. 12, 1984

[54] CLOSED TORUS TIRE/RIM ASSEMBLY

[75] Inventor: William T. Smith, Uniontown, Ohio

[73] Assignee: The Goodyear Tire & Rubber Company, Akron, Ohio

[21] Appl. No.: 361,937

[22] Filed: Mar. 25, 1982

[51] Int. Cl.³ .................... B60B 25/08; B60B 25/18
[52] U.S. Cl. ............................... 152/410; 301/23
[58] Field of Search ....... 152/406, 409, 410, DIG. 10, 152/405; 301/23, 35 SS, 35 SL

[56] References Cited

U.S. PATENT DOCUMENTS

| | | | |
|---|---|---|---|
| 2,835,303 | 5/1958 | Woodward | 152/410 |
| 3,327,754 | 6/1967 | Travers | 152/410 |
| 3,354,927 | 11/1967 | Pile | 152/410 |
| 3,998,258 | 12/1976 | Grawey et al. | 152/405 |

OTHER PUBLICATIONS

Goodyear, "Rims", Catalog S-8811: Sep. 1958: pp. 20, 21, 22, 52.

*Primary Examiner*—David A. Scherbel
*Attorney, Agent, or Firm*—L. R. Drayer

[57] ABSTRACT

A tire and rim assembly has a closed torus tire mounted upon a three-piece rim that may be adapted for use with a variety of wheels and vehicles. The rim consists of a rim base, a tapered base band and an expandable locking ring. An adapter may be attached to the rim base to facilitate the use of the tire and rim assembly with various wheels. In the preferred embodiment the rim base is a weldment.

2 Claims, 1 Drawing Figure

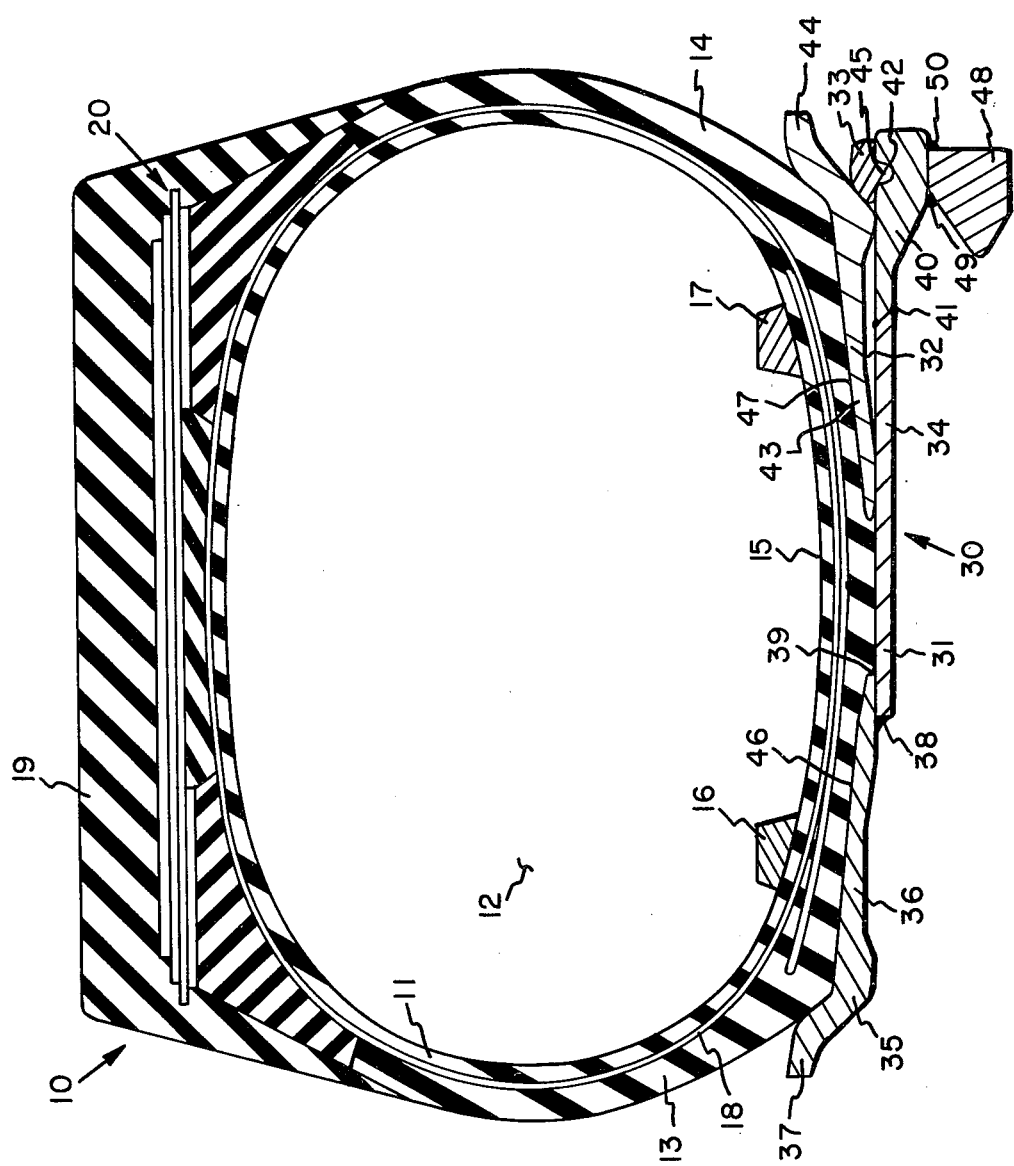

CLOSED TORUS TIRE/RIM ASSEMBLY

BACKGROUND OF THE INVENTION

The present invention relates to the assembly of a rim and a closed torus tire mounted thereon.

As used herein, "closed torus tire", "closed tube tire", and "closed toroidal tire" will be understood to mean a tire providing a completely closed inflation chamber capable alone, without being mounted on a rim, of containing fluid pressure therein higher than the surrounding atmospheric pressure. In this specification, closed torus tire, closed tube tire, and closed toroidal tire are used and intended to distinguish from "open-base tires" having generally horseshoe-shaped radial cross-sections, thus not being capable of containing fluid pressure without being mounted on a rim.

Open base, or conventional horseshoe-shaped tires have substantially inextensible annular beads located near the radially inner extremities of their sidewalls. The beads hold the open base tire on a rim by being forced against flanges, located at the axial ends of the rim, by the fluid pressure inside the inflation chamber formed by the assembly of the tire and rim. Closed torus tires to not have beads, instead they have "roll-restraining hoops" which are substantially inextensible annular rings to keep the closed torus tire from rolling off of a rim in a lateral direction. The configuration of the roll-restraining hoops in a closed torus tire makes it impossible to button-hook a closed torus tire onto a single piece rim. Heretofore, closed torus tires have either been: bonded to annular rims, as taught in U.S. Pat. No. 4,265,293, issued to W. W. Curtiss, Jr., et al; manufactured integral to rims, as taught in U.S. Pat. No. 4,110,141, issued to V. A. Caravito; or mounted on specially designed rims such as those described in U.S. Pat. Nos. 3,998,258, issued to C. E. Grawey et al, and 4,181,169 issued to C. E. Grawey et al. The closed torus tire/rim assembly of this invention is adaptable to a variety of vehicles and makes the mounting of a replacement tire upon the rim, without damaging the tire originally mounted upon the rim, possible.

BRIEF DESCRIPTION OF THE DRAWING

Referring to FIG. 1, which is the only drawing in this specification, there is shown in radial cross-section the assembly of a closed torus tire mounted upon a three-piece rim in accordance with the preferred embodiment of the invention. As used herein, "radial" and "radially" refer to planes which include the axis of rotation of a rim and a tire mounted thereon. "Axial" and "axially" as used herein, shall refer to the axis of rotation of a rim and a tire mounted thereon. "Axially inward" shall mean a direction moving from one axial end of a rim toward the other axial end of the same rim, and "axially outward" shall mean a direction going from one axial end of a rim away from the other axial end of the same rim.

DESCRIPTION OF THE INVENTION

The closed torus tire 10 shown in FIG. 1 is a general representation of this type of tire, and its exact structure is not a limitation upon this invention as described and claimed herein. An air-impervious innerliner 11 surrounds the inflation chamber 12, which may have fluid pressure introduced therein by means of an inflation valve (not shown) located in either one of the sidewalls 13,14 or in the base portion 15 of the tire. Roll-restraining hoops 16,17 are substantially inextensible annular rings that prevent the tire from rolling off of the rim in an axial direction. A reinforcing cord or cable 18 may either be helically wound around the inner-liner in a radial orientation, as taught in U.S. Pat. No. 3,776,792, issued to C. E. Grawey, or embedded in a sheet of an elastomer and then wrapped around a form as taught in U.S. Pat. No. 3,989,564, issued to J. W. Touchette et al, with both of these patents being incorporated by reference herein for the purpose of teaching methods of manufacturing the closed torus tire that is a part of the assembly of the present invention. The carcass reinforcing structure 18 of a closed torus tire usually has its cords or cables oriented in such a manner that they are substantially perpendicular to the mid-circumferential plane of the tire, so that the tire has what is commonly known in the art as a radial construction. The mid-circumferential plane of a tire is a plane that is perpendicular to the tire's axis of rotation, located midway between the sidewalls at the point of their axially greatest width. A tread portion 19 overlies the radially outer portion of the carcass-reinforcing structure, and a tread-reinforcing structure 20 of belts or breakers is interposed between the tread portion and the carcass-reinforcing structure.

The preferred embodiment of the invention shown in FIG. 1 is the combination of a closed torus tire 10 mounted upon a rim 30. The three-piece rim 30 comprises a rim base 31, a tapered base band 32, and an expandable locking ring means 33. As used herein "tapered" refers to a surface that is inclined at an angle with respect to a line parallel to the axis of rotation of a tire and rim assembly, or to a rim component having such an inclined surface. The rim base 31 comprises a weldment of three components, each of the components having a generally hollow cylindrical shape with radially inner and outer circumferential surfaces and first and second axial ends. The first component of the weldment is a center band 34 which is an endless ring having a predetermined diameter that is selected to complement, or mate with, the inner diameter of the base portion 15 of the closed torus tire 10. A back section 35 is the second component of the rim base weldment and comprises a tapered base portion 36 with an integrally formed sidewall protecting flange 37 extending radially outward along its first axial end, while the second axial end is weldably attached by two circumferential welds 38,39 to a first axial end of the center band. In the preferred embodiment, the radially inner circumferential surface of the tapered base portion 36 of the back section 35 has a diameter that is slightly larger than that of the radially outer circumferential surface of the center band 34 and the tapered base portion overlaps the first axial end of the center band, so that it is slidably mounted around the center band, and is weldably attached to the center band by two circumferential welds 38,39. A gutter band 40 is the third component of the rim base weldment and has a radially outer circumferential surface of the same diameter as the radially outer circumferential surface of the center band 34. The first axial end of the gutter band 40 is weldably attached 41 to the second axial end of the center band, and the gutter band has at least one annular groove 42 in its radially outer circumferential surface near its second axial end.

While the rim base in the preferred embodiment may be fabricated from flat stock that has been rolled into predetermined configurations for each component of the weldment, the rim base may, in an alternate embodiment, be made of one piece by machining it from a large forging having a generally hollow cylindrical shape with radially inner and outer circumferential surfaces and first and second axial ends, at least one annular groove in the radially outer circumferential surface near its first axial end, and an integrally formed tapered base portion extending radially and axially outward along the second axial end with an integrally formed side protecting flange adjacent thereto.

The tapered base band 32 has a generally hollow cylindrical shape with radially inner and outer circumferential surfaces and first and second axial ends. The radially inner circumferential surface of the tapered base band has a diameter slightly larger than that of the radially outer circumferential surface of the rim base 31. The tapered base band comprises a tapered portion 43 with an integrally formed sidewall protecting flange 44 extending radially and axially outward along one axial end thereof. The tapered base band has a width, with respect to the axis of rotation of the tire and rim assembly, that is less than one-half of the width of the rim base. The tapered base band is slidably interposed between the closed torus tire 10 and the rim base 31, after the closed torus tire has been slidably mounted around the rim base, with the sidewall protecting flange of the tapered base band being located radially outward of the annular groove 42 in the rim base.

The expandable locking ring means 33 may, for example, be an annular ring having a radially inward projecting portion 45 of a shape that is complementary to the annular groove 42 in the rim base, and axially inward surfaces designed to be complementary to, and mate with the radially inner surface of the tapered base band, when the tire and rim combination is assembled and the tire has been inflated. The expandable locking ring means 33 is mounted with its radially inward portion 45 in the annular groove 42 in the rim base. Axially inward surfaces of the expandable locking ring means are in contact with the radially inner circumferential surface of the tapered base band to retain the tapered base band in place when the closed torus tire is inflated. The radially outer circumferential surfaces 46,47 of the tapered base portion of the rim base and the tapered portion of the tapered base band are tapered at an angle of about 6 degrees with respect to a line parallel to the axis of rotation of the tire and rim assembly. In the preferred embodiment, the back section 35, which is a component of the rim base weldment 31, is a mirror image part to the tapered base band 32. This commonality of components expedites the manufacturing of the rim and may greatly reduce its cost. The rim may be produced of any suitable material selected by standard engineering procedures, such as steel.

An adapter ring 48 having radially inner and outer surfaces may be weldably attached to the radially inner circumferential surface of the rim base 31 to allow the torus tire/rim assembly to be used in conjunction with a variety of wheel structures and vehicles. The radially outer surface of the adapter ring may be attached by two circumferential welds 49,50 to the radially inner circumferential surface of the rim base.

While certain representative embodiments and details have been shown for the purpose of illustrating the invention, it will be apparent to those skilled in the art that various changes and modifications may be made therein without departing from the spirit or scope of the invention.

What is claimed is:

1. A tire and rim assembly comprising a closed torus tire mounted upon a rim, said rim comprising:
   (a) a rim base that is a weldment of three components, each said component having a generally hollow cylindrical shape with radially inner and outer circumferential surfaces and first and second axial ends, said three components being:
     (i) a center band;
     (ii) a back section having a tapered base portion with an integrally formed sidewall protecting flange extending radially outwardly along the first axial end of said back section, the radially outer circumferential surface of said tapered base portion being inclined with respect to a line parallel to the axis or rotation of the tire and rim assembly, said back section having a width, with respect to the axis of rotation of said tire and rim assembly, that is less than one-half the width of said rim base, the radially inner circumferential surface of the tapered base portion of said back section having the same diameter at each axial end thereof with said diameter being only slightly larger than that of the radially outer circumferential surface of said center band, the second axial end of said tapered base portion and part of the radially inner circumferential surface of the tapered base portion of the back section overlapping the first axial end of the center band and being weldably attached thereto; and
     (iii) a gutter band having a radially outer circumferential surface with the same diameter as the radially outer circumferential surface of said center band, the first axial end of said gutter band being weldably attached to the second axial end of said center band, the radially outer circumferential surface of said gutter band having at least one annular groove therein located near the second axial end of the gutter band, said closed torus tire being mounted around said rim base;
   (b) a tapered base band that is a mirror image part to the back section component of said rim base, said tapered base band being interposed between said closed torus tire and said rim base with the tapered base portion of the tapered base band disposed axially inwardly of the annular groove in the gutter band component of said rim base, both ends of the radially inner circumferential surface of the tapered base band being in contact with the radially outer circumference of the in base; and
   (c) an expandable lock ring means mounted with its radially inward portion in the annular groove in the gutter band component of said rim base, and axially inner surfaces of said expandable lock ring means being in contact with the radially inner circumferential surface of said tapered base band to retain said tapered base band in place when said closed torus tire is inflated.

2. A tire and rim assembly according to claim 1 wherein the radially outer circumferential surfaces of the tapered base portions of the back section component of said rim base and said tapered base band are inclined at an angle of about 6° with respect to a line parallel to the axis of rotation of said tire and rim assembly.

* * * * *

UNITED STATES PATENT AND TRADEMARK OFFICE
CERTIFICATE OF CORRECTION

PATENT NO. : 4,453,583
DATED : June 12, 1984
INVENTOR(S) : William Thomas Smith

It is certified that error appears in the above-identified patent and that said Letters Patent are hereby corrected as shown below:

At Column 4, line 18 "or" should be --of--.

At Column 4, line 52, "in" should be --rim--.

Signed and Sealed this

Fourth Day of December 1984

[SEAL]

Attest:

GERALD J. MOSSINGHOFF

Attesting Officer — Commissioner of Patents and Trademarks